Patented June 23, 1925.

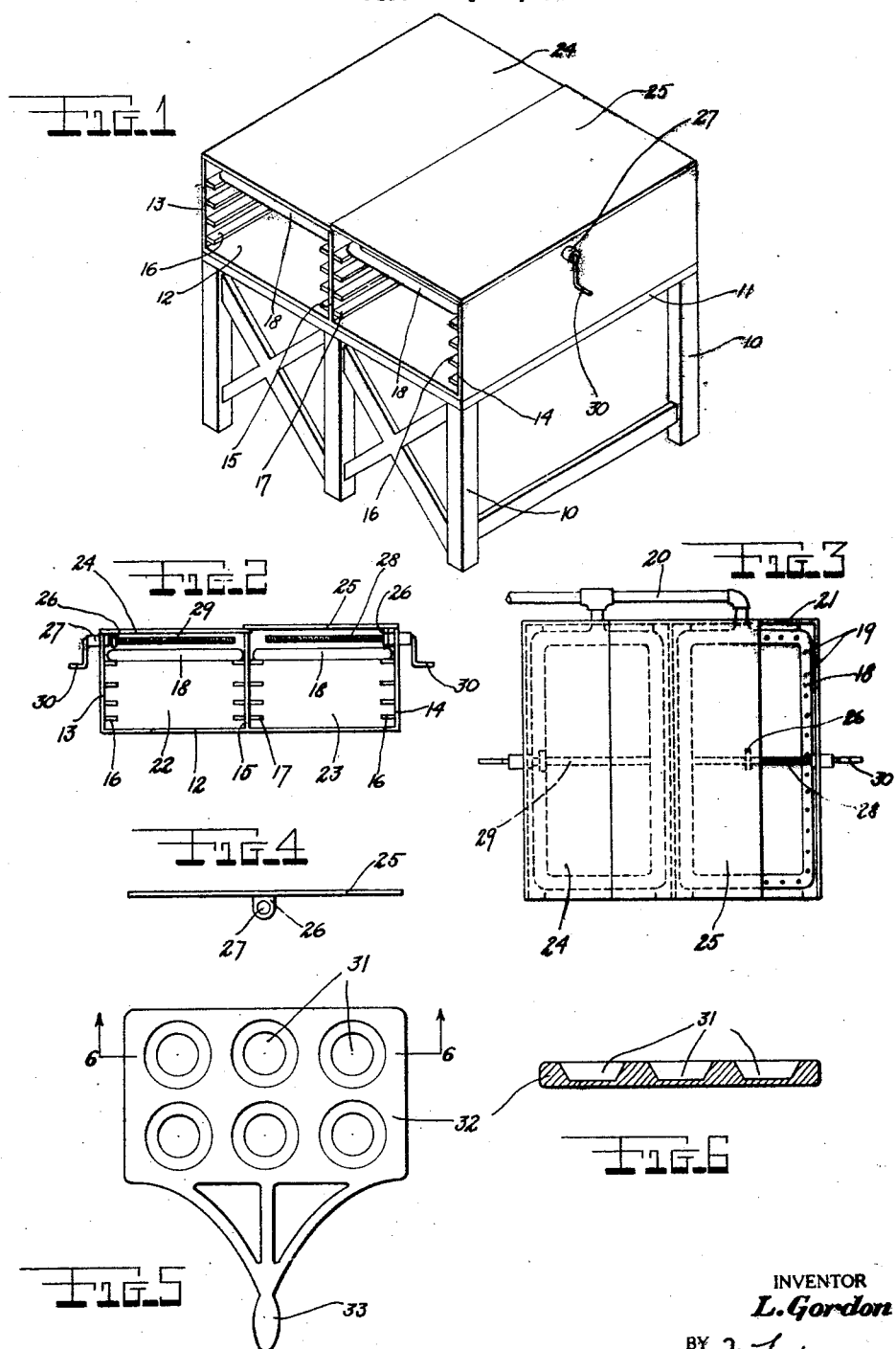

1,543,255

UNITED STATES PATENT OFFICE.

LOUISE GORDON, OF NEW YORK, N. Y.

ICE-CREAM OVEN.

Application filed July 14, 1924. Serial No. 726,054.

*To all whom it may concern:*

Be it known that I, LOUISE GORDON, a citizen of Hungary, residing at New York, in the county of New York and State of New York, have invented certain new and useful Improvements in Ice-Cream Ovens, of which the following is a specification.

The main object of this invention is to provide an edible covering over ice cream bricks which are placed in an oven, after being coated, for a short interval of time in order to bake the surface of the coating to improve both the appearance and taste of the article.

Another object is to provide an oven adapted to bake the coated ice cream bricks. The oven has heat generated therein by gas burners and is provided with a pair of sliding doors which cover or uncover the gas burners accordingly as a screw is rotated in the proper direction.

These and other objects will become apparent in the description below in which characters of reference refer to like-named parts in the drawing.

Referring briefly to the drawing, Figure 1 is a perspective view of the oven mounted on a stand or table.

Figure 2 is a front elevational view of the oven.

Figure 3 is a top plan view of the oven.

Figure 4 is an end elevational view of one of the doors.

Figure 5 is a top plan view of the ice cream roasting iron.

Figure 6 is a cross sectional view taken on line 6—6 of Figure 5.

The constituents of the roasted ice cream are gelatine, the beaten white of eggs, sugar, and flavor and frozen ice cream, the ice cream being formed into circular portions similar to a cookie. The gelatine, the beaten whites of eggs, and sugar and flavor are mixed to a thick consistency similar to a light but slow flowing batter. The batter is then ready to be used by covering the entire circular portion of ice cream, the particular method of which will be more fully hereinafter described.

Referring in detail to the drawing, the numeral 10 indicates the legs of a table which supports a top 11 on which the base 12 of the oven rests. At the side edges of the base 12, vertical walls 13 and 14 extend upwardly, and an additional central wall 15 is provided which extends upwardly in a similar manner and parallel to the walls 13 and 14. The side of the walls 13 and 14 which face inwardly are provided with ledges 16, and an intermediate wall 15 located centrally in the oven has ledges 17 mounted on one side, and ledges 15, mounted on the opposite side. Said ledges support hollow tubular burner frames 18 which are rectangular in outline and are provided with spaced-apart jets 19 thru which gas flows from an outlet pipe 20. This outlet pipe 20 is mounted exterior of the casing behind the rear wall 21 of the oven and leads to a gas fuel line which may be at any point distant from the oven. The walls 13, 14, and 15, divide the oven into compartments 22 and 23 each of which is covered by a door. The compartment 22 is covered by a door 24 which slides inwardly or toward the opposite side of the oven. The compartment 23 is covered by a similar door 25 which slides in an opposite direction toward the opposite side of the oven. Each of the doors has an ear 26 rigid therewith in which a threaded opening 27 is provided. Near the upper central portions on the external surfaces of the walls 13 and 14, sleeves 27 are mounted and are provided with holes which pass therethru and rotatably receive the threaded shafts 28 and 29, each of said shafts cooperating with an ear 26. These shafts extend horizontally in the compartments 22 and 23 toward each other and pass thru their respective sleeves 27, the ends projecting from said sleeves being formed into cranks 30 by which said shafts are rotated.

When the batter has been prepared in the manner previously described, blocks of ice cream of circular formation are dipped into this batter and then placed in depressions 31 formed in the body 32 by an iron which has a handle 33 extending from one side of the body. The width of the iron is of such dimension as to be readily slidable in either of the compartments 22 or 23 and is adapted to rest on the ledges 16 or 17 at any desired position. The ignited gas passing from the jets 19 heats the oven to a relatively high temperature before the iron 32 and ice creams are insterted therein. When the oven compartments have been thoroughly heated, the iron 32 which is loaded with ice cream bricks covered by the batter, is then inserted into the compartment and given a quick baking so that the egg white and gelatine will be browned. The browning of the cover of these ice bricks takes a relatively short time, and after this has occurred, the iron is immediately removed from the compartment and allowed to quickly cool. It will be noted that this device permits the baking of the covering to be accomplished before the higher temperature has impregnated the ice cream brick which would otherwise immediately melt.

I claim:—

In an oven for roasting ice cream comprising a base having walls forming separate compartments, ledges on said walls, and sliding doors covering said oven, sleeves on the side walls of said oven, threaded studs passing into said oven and being rotatable in said sleeves and a crank for rotating said stud, an ear on each door having a threaded opening therein, said ear receiving the stud threadably therein, said stud when rotated being adapted to move said door in either direction.

In testimony whereof I affix my signature.

LOUISE GORDON.